United States Patent Office 3,010,437
Patented Nov. 28, 1961

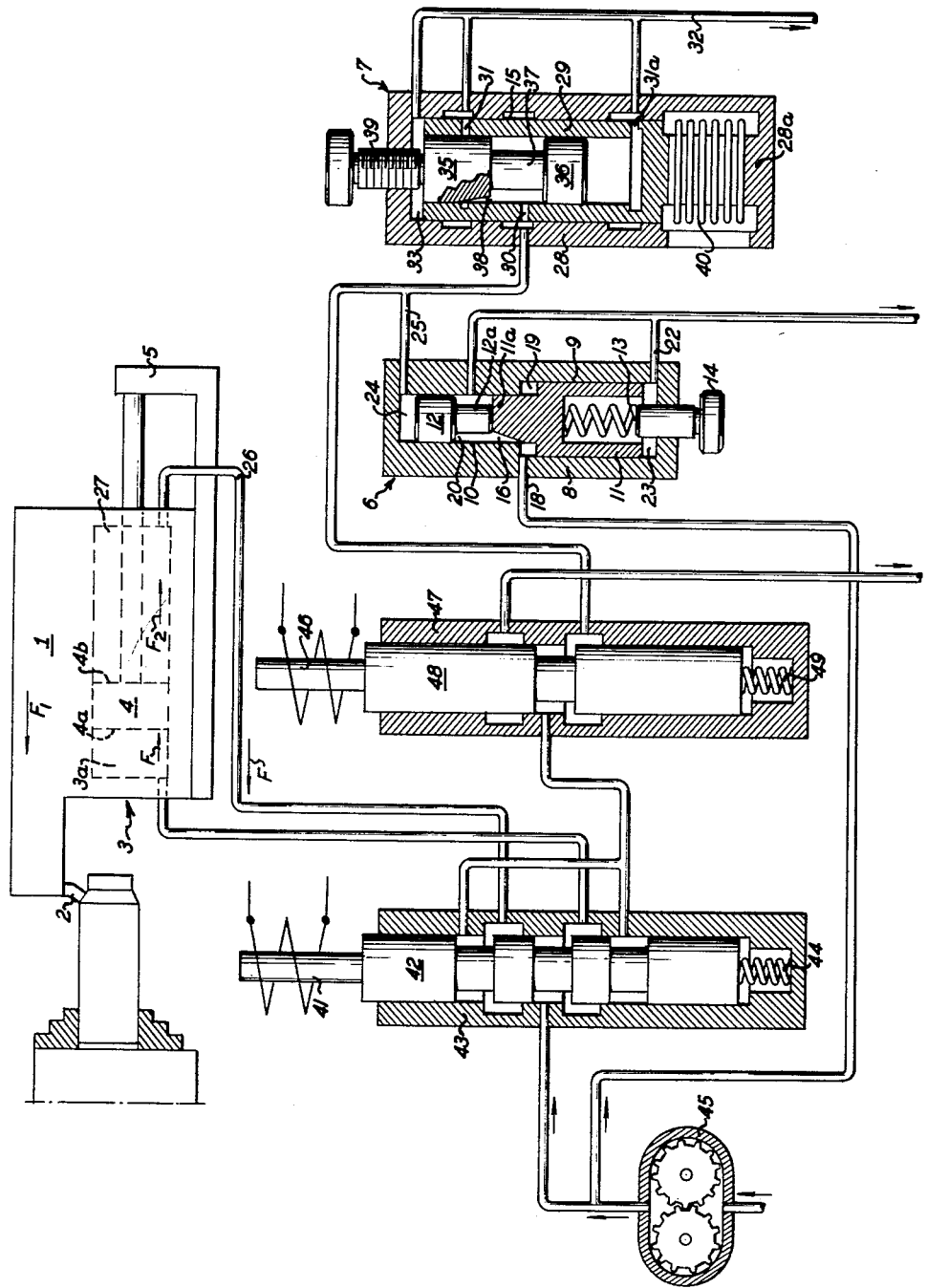

3,010,437
HYDRAULIC AUTOMATIC FEED REGULATING DEVICE FOR MACHINE TOOLS AND OTHER APPLICATIONS
Edmond André, Gennevilliers, France, assignor to Victor Salomé and Clotaire Salomé, Nanterre, France
Filed Jan. 17, 1957, Ser. No. 634,674
Claims priority, application France Jan. 26, 1956
1 Claim. (Cl. 121—45)

This invention relates to devices intended automatically to regulate the feed movement of hydraulically driven machine tool members or the like.

The invention contemplates a device which consists essentially of the combination of the following with the normal hydraulic drive of a machine: on the one hand, a regulator having a differential piston subject to the action of an adjustable spring, acting as a discharge valve and effecting the automatic regulation in dependence on the resistance to the feed; and on the other hand, a thermal regulator containing a throttle and a deformable cell or other member sensitive to heat, intended to correct the feed variations produced by changes in the viscosity of the circulating hydraulic drive fluid.

In order that the subject of the invention may be better understood, a preferred embodiment is illustrated diagrammatically in FIGURE 1 of the accompanying drawing, while FIGURE 2 illustrates the invention in association with a known reversing means.

With reference to the drawing, it will be seen that reference 1 denotes the carriage of a machine tool, of which carriage it is desired to correct automatically the feed variations produced during working by the variations in the resistance encountered by the tool 2 carried by said carriage and by the changes in the viscosity of the hydraulic drive fluid.

The hydraulic drive of the carriage 1 comprises a main cylinder 3 in which is slidably mounted a piston 4 of which the rod is connected to an appropriate frame 5.

According to the present invention, this hydraulic drive is combined on the one hand with a regulator 6 having a differential piston, the object of which is to ensure automatic regulation in dependence on the resistance to the feed as encountered by the carriage and on the other hand with a thermal regulator 7 containing a throttle and a deformable cell having a high coefficient of expansion, intended to correct the feed variations produced by changes in the viscosity of the circulating hydraulic drive fluid.

The regulator 6 comprises a cylinder 8 having two bores 9 and 10 of different diameters in which there are respectively housed the two heads 11 and 11a of a differential piston subject to the action of a spring 13 adjustable by means of a knob 14. In the head 11a is contrived a throttling slot 16. On this head there rests by its tail piston-rod 12a, a piston 12 also housed in the bore 10.

The chamber 3a in front of the piston 4 is connected through a pipeline 17 to a source of supply P of fluid under pressure. This pipeline includes a branch 18 leading into the chamber 19 formed between the outside wall of the head 11a and the wall of the bore 9.

The chamber 20 contained between the upper face of the head 11a and the lower face of the piston 12 is connected to the vessel containing the feed fluid by means of a pipeline 21 provided with a branch 22 connected to the chamber 23 situated beneath the lower face of the aforesaid head of the piston 11. Finally, the chamber 24 formed above the piston 12 is connected through a pipeline 25 to a pipeline 26 leading on the one hand into the chamber 27 of the cylinder 3 and on the other hand into a circular recess 15 contrived in the thermal regulator 7 which will now be described in detail.

Said regulator comprises a cylinder 28 inside which is housed a sleeve 29 the wall of which is perforated by an aperture 30 leading into the aforesaid circular recess 15, and by two apertures 31 and 31a connected to a pipeline 32. The upper end of said pipeline 32 leads at 33 into the upper part of the cylinder 28 and its lower end leads at 34 into the hydraulic drive fluid tank.

Inside the sleeve 29 is housed a throttling block comprising a head 35 provided with a slot 38 and connected to a second head 36 by a spindle 37, the position of this block in the sleeve 29 being adjustable by means of a screw 39 fixed to the head 35.

The lower end 28a of the cylinder 28 is connected with a thermally expansible capsule 40, the lower end of which is supported against the base 28a of the cylinder 28.

The operation of the above described device is as follows: The fluid, of which the pressure in the pipeline is calibrated by the spring 13, acts on the front face 4a of the piston 4 (arrows F) determining the feed of the carriage 1 in the direction of the arrow F1. The face 4b of the piston 4 drives the fluid in the direction of the arrows F2 into the chamber 24 through the pipelines 25 and 26, and into the recess 15 of the cylinder 29 of the regulator 7 through the pipeline 26. In the chamber 24 the fluid pushes the piston 12 against the head 11a of the differential piston. If the resistance encountered by the carriage decreases, the speed of movement of the carriage tends immediately to increase. In consequence, the amount of fluid delivered from the chamber 27 (arrows F2) increases and determines an increase in pressure on the piston 12. This pressure, overcoming the thrust of the spring 13, brings about the displacement of the said piston and, in consequence, the escape of a larger amount of fluid via pipeline 18 and through the slot 16 (return to the tank). This escape creates a pressure drop in the chamber 3a and instantaneously restores the original feed.

Conversely, if the resistance to the feed of the carriage increases, its speed reduces, while at the same time the amount of fluid delivered to 27 decreases, thus causing a pressure drop on the piston 12 and a reduction in the opposing thrust of the spring 13. The differential piston 11—11a rises again in the cylinder 8, its head 11a reducing the escape of the fluid through the aforesaid slot 16. The pressure on the face 4a of the piston 4 increases and thus restores the initial feed.

It was indicated hereinabove that the fluid is delivered simultaneously to the piston 12 and to the cylinder 28 of the thermal regulator. For a given setting of the slot 38 of the throttle 35, the hydraulic drive fluid may occasionally be considerably heated during working and, in consequence, the viscosity of said fluid changed.

It will be seen that since the capsule 40 is in contact with the feed fluid, it will be subject to the effect of the temperature variations of this fluid and its volume variations transmitted linearly to the sleeve 29 will manifest themselves as many variations in the position of the aperture 31 in relation to the slot 38. If said slot is correctly machined in relation to the variations of the cell 40, there will be obtained for the passage of the fluid under pressure admitted at 30 into the chamber formed between the heads 35 and 36 a variable throttling and a permanent regulation in dependence on the temperature of the fluid used.

Thus by the combination of the two regulators 6 and 7, automatic correction is produced for the variations in the feed of the carriage in dependence upon the resistance encountered by said carriage and upon the viscosity of the hydraulic drive fluid.

As illustrated in FIGURE 2, the regulator 6 and thermal regulator 7 for the carriage 1 are associated with conventional reversing and speed control means connected in the pipelines 17 and 26. The reversing means comprises an electromagnet 41 for actuating a valve member 42 slidable in a valve body 43. A spring 44 biases the valve member 42. The speed control means comprises a second electromagnet 46 for actuating a valve member 48 slidable in a valve body 47. Member 48 is biassed by a spring 49.

Valve body 43 is connected by pipelines 17A and 17B, respectively, to chamber 3a and source P shown as a rotary gear pump 45. Valve body 47 is connected by pipelines 26A and 26B, respectively, to chamber 27 and thermal regulator 7, and by pipeline 50 to the sump X of pump 45. Valve bodies 43 and 47 are interconnected by pipeline 51.

When associated with conventional reversing and speed control means as shown in FIGURE 2, the invention provides for two-directional control of the carriage 1 to left or right in rapid advance, or at work feed controlled by knob 14 acting on head 11.

In the position shown, the carriage 1 moves to the left in the direction of arrow F1 with electromagnet 41 energized to urge valve member 42 downward for supplying pressure fluid to chamber 3a, while the fluid in chamber 27 is exhausted through valve bodies 43 and 47 with electromagnet 46 energized to urge valve member 48 downward, thereby channeling the fluid through the regulator 6 and thermal regulator 7 as previously described.

Pump 45 is directly connected by pipeline 18 to regulator 6 for compensating the work thrust required of the tool 2 in either direction.

If electromagnet 46 is not energized, valve member 48 is freely urged by spring 49 to a position where the fluid is exhausted directly to the sump, thereby causing rapid advance, depending on the output of pump 45 and the volume of cylinder 3, for a predetermined time span.

When neither electromagnet is energized, there is rapid advance in the opposite direction from left to right, because the direction of fluid flow through valve bodies 43 and 47 is reversed, valve member 42 being freely urged by spring 44. Thus valve member 42 supplies fluid from pump 45 to the rear of piston 4 into chamber 27 and from the front of piston 4 out of chamber 3a toward valve body 47.

If at any time during left-to-right rapid advance electromagnet 46 is energized to move valve member 48 against spring 49, fluid is exhausted from chamber 3a through regulator 6 to cause work feed at predetermined speed controlled by knob 14 acting on head 11 as described.

It will be understood that the above described embodiment may have modifications without departing from the scope of the invention.

What I claim is:

A regulating device for regulating the hydraulic control of a machine tool operated by a fluid pressure line, comprising in combination: a hydraulic regulator comprising a cylinder having communicating chambers with different respective bores, a piston in one of said bores and defining a throttling passage between both said bores, a free piston in the other of said bores cooperating with the first said piston, means connecting said one bore with the fluid pressure line operating the machine tool, a sump, a return line connecting said other bore with said sump, said means being thereby connected through said throttling passage to said sump, a return line connected to said machine tool, a thermo-hydraulic regulator connected to the other of said bores and comprising a cylinder, a thermo-expansive element in the cylinder, a hollow slide in the cylinder having ports, grooves in the interior of the cylinder cooperating with the ports, one groove being connected to the return line from the machine tool to the sump and the other grooves being connected to the return line from the other said bore to the said sump, and an adjustable throttle member in the slide having two heads, one of said heads having a varying cross section for controlling fixed setting movement of the machine tool as a function of fluid temperature transmitted, to the slide by the thermo-expansive element.

References Cited in the file of this patent

UNITED STATES PATENTS

| | | |
|---|---|---|
| 1,814,630 | Myers | July 14, 1931 |
| 1,920,752 | Kissing et al. | Aug. 1, 1933 |
| 1,942,403 | Arni | Jan. 9, 1934 |
| 2,004,638 | Smith | June 11, 1935 |
| 2,020,765 | Breitenbach | Nov. 12, 1935 |
| 2,028,766 | Ernst et al. | Jan. 28, 1936 |
| 2,590,769 | Herrstrum | Mar. 25, 1952 |
| 2,601,157 | Le Lan | June 17, 1952 |

FOREIGN PATENTS

| | | |
|---|---|---|
| 628,843 | Great Britain | Sept. 6, 1949 |